Feb. 10, 1942.     C. L. EKSERGIAN ET AL     2,272,601
ACCELERATION RESPONSIVE DEVICE
Filed Jan. 11, 1939     2 Sheets-Sheet 1
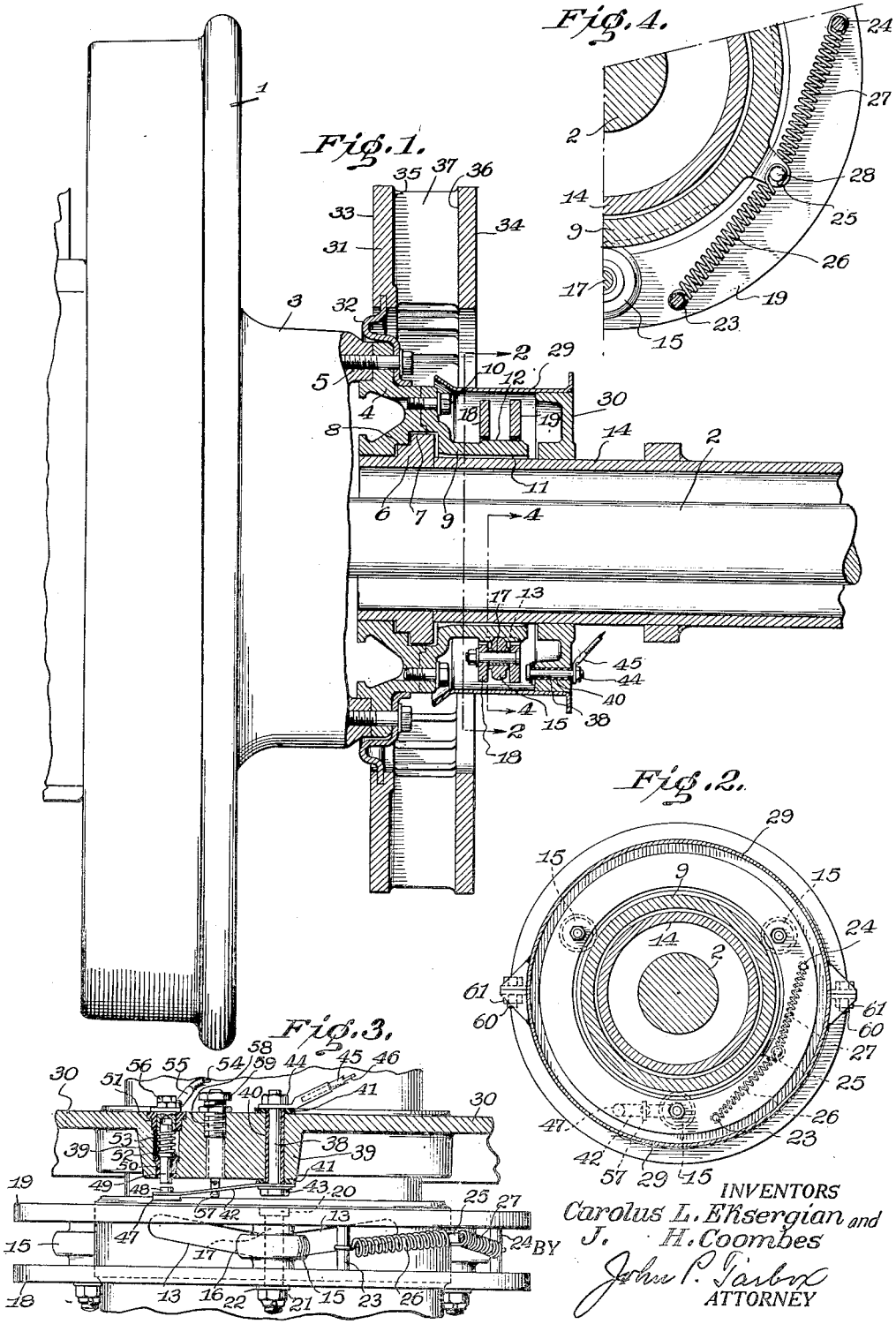
INVENTORS
Carolus L. Eksergian and
J. H. Coombes
BY John P. Tarbox
ATTORNEY

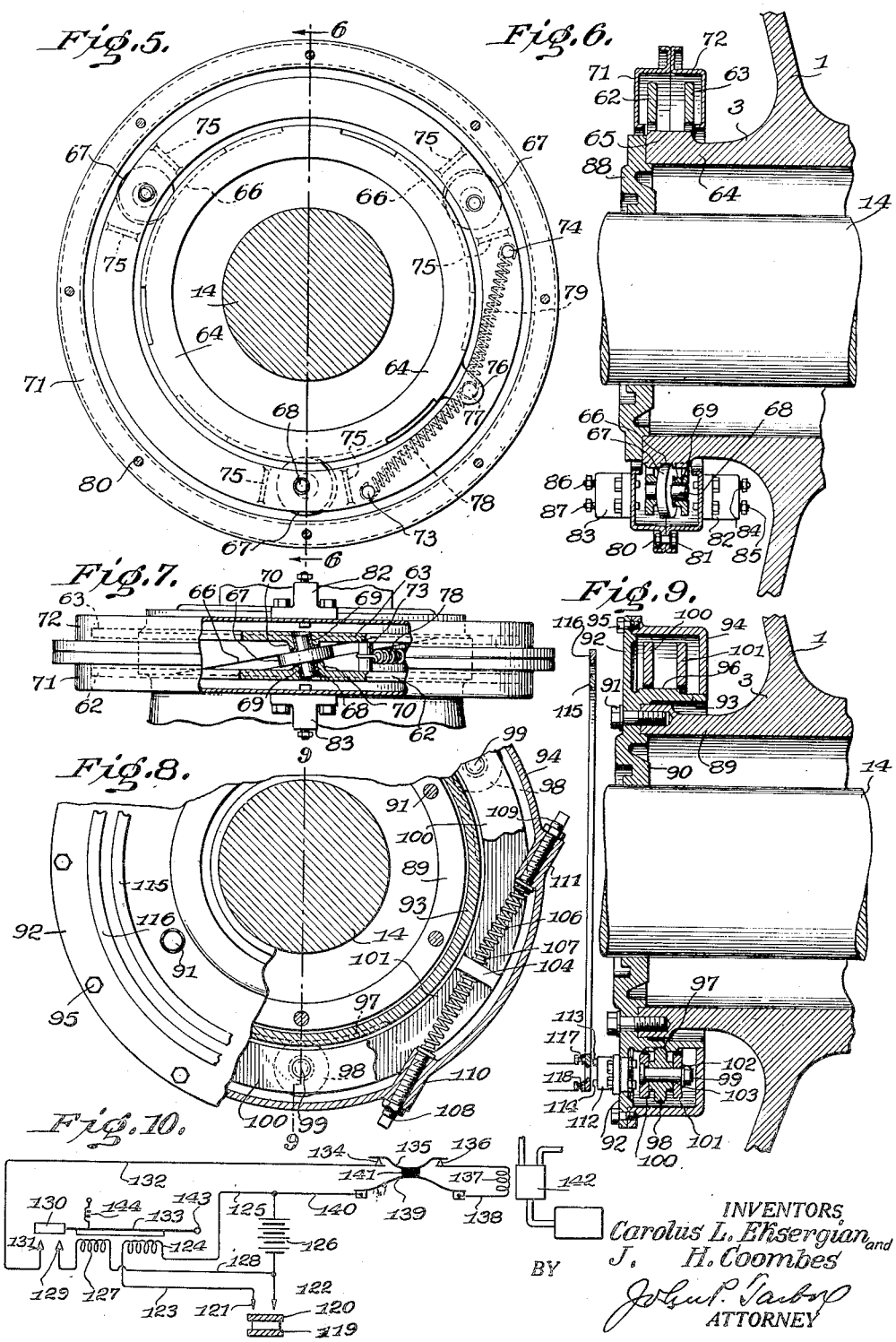

UNITED STATES PATENT OFFICE 2,272,601

ACCELERATION RESPONSIVE DEVICE

Carolus L. Eksergian and Joseph H. Coombes, Detroit, Mich., assignors to Budd Wheel Company, Philadelphia, Pa., a corporation of Pennsylvania Application January 11, 1939, Serial No. 250,276

9 Claims. (Cl. 264—1)

The present invention relates to means which will respond to angular acceleration of a rotating member, in either sense, that is, when the velocity either increases or decreases. These two changes of velocity are often popularly called acceleration and deceleration, respectively, but for the purposes of the present discussion the term acceleration is to be understood in its correct physical meaning, to include change of velocity in either direction and, therefore, to embrace both said concepts.

The device comprises an inertia element which is carried by a rotating member and which normally rotates with said member and at the same angular velocity, but which temporarily deviates in angular velocity from said member whenever any substantial acceleration in the motion is initiated.

The deviation in the rates of the inertia element and the rotating member is utilized in accordance with the present invention to produce a signal or a control impulse.

In one type of the invention, it comprises two coaxially mounted rotating elements, one of which has a certain amount of free play with respect to the other, and which are so mounted that when there is an acceleration in the motion one of the members will shift with respect to the other and thereby produce a mechanical or electrical effect.

More specifically, the invention contemplates mounting an inertia ring upon the axle or hub of a wheel, said inertia ring being free to move to a limited extent with respect to the wheel and in so moving being caused to shift toward or away from the wheel, thereby providing the electrical contact or mechanical impulse above mentioned.

Still more specifically, the present invention relates to means intended primarily to cooperate with vehicle wheels and axles to produce an electrical impulse whenever the vehicle is accelerated, regardless of the direction of rotation or the angular velocity of said rotating elements, whereby any desired physical effect may be initiated such, for example, as the control of a brake or the actuation of an indicator or recorder, etc.

Several embodiments of the invention are disclosed in the present specification and the accompanying drawings, wherein:

Fig. 1 is an elevation of a vehicle wheel having the invention applied thereto, certain parts being shown in axial section, Fig. 2 is a section through a portion of the mechanism illustrated in Fig. 1 on the plane indicated by the line 2—2, looking in the direction of the arrows, Fig. 3 is a fragmentary elevation showing part of the inertia ring, and the electrical contacts cooperating therewith, Fig. 4 is a fragmentary cross-section through a portion of the mechanism shown in Fig. 1 on the plane indicated by the line 4—4, looking in the direction of the arrows, Fig. 5 is an end view of a modified form, Fig. 6 is a fragmentary axial section through the device shown in Fig. 5, the section being made on the plane indicated by the line 6—6, looking in the direction of the arrows and the axle housing being shown in elevation, Fig. 7 is a plan view partly broken away, and partly in section, to show one of the rollers and cooperating parts, Fig. 8 is an end view, partly broken away and partly in section of a still further modification, Fig. 9 is a longitudinal section through the structure shown in Fig. 8, the section being made on the plane indicated by the line 9—9, looking in the direction of the arrows, and Fig. 10 is a circuit diagram illustrating certain electrical devices which may be used in connection with the invention.

Referring first to Fig. 1, the wheel 1 there shown is loosely mounted with respect to the housing 14 which surrounds the axle 2. The hub 3 of the wheel has an annular member or flange 4 secured thereto in any suitable way, for example by means of the cap screws 5, so that the member 4 will rotate with the wheel 1.

The member 4 rotates freely about the collar 6 which may have a number of shoulders turned or otherwise formed therein, as shown at 7, to cooperate with similar shoulders 8 in the element 4, the collar 6 being secured to the housing 14 in any desired way.

A further annular member or collar 9 is secured to the member 4 in any suitable manner, for example by means of the cap screws 10, so that the collar 9 will rotate with the wheel 1. This collar 9 has a tubular portion 11 projecting along the housing 14 and rotatable around said housing. The tubular portion 11 has an outer cylindrical face 12 which in the present instance has three spaced grooves therein, one such groove being shown at 13. This groove 13 is shown in plan view in Fig. 3 and may be described in general as having a curved bottom and extending in both directions from a central point, as shown in Fig. 3. While three such grooves are provided as a convenient number, it is, of course, clear that more or less may be found satisfactory and there is no reason why any other arbitrary number of such grooves could not be provided if desired.

A roller 15 cooperates with each groove 13 and has its peripheral surface 16 suitably curved to fit and cooperate with such grooves. Each roller 15 is mounted on a suitable pivot, for example, the shank of a bolt 17 which passes through the roller, so that said roller may rotate freely thereon.

Two properly spaced rings 18 and 19 form the anchorages for the bolts 17, which may have their heads 20 countersunk in one of the rings, for example the ring 19, and project through the other ring 18 to which they may then be secured in any desired way, for instance by means of the nuts 21. Suitable lock washers 22 or any other satisfactory means may be provided to keep the nuts 21 from loosening on the respective bolts in service.

The rings 18 and 19 are maintained at the correct spacing from one another by rigid elements such as the cross bars or pins 23, 24, any desired number of which may be provided. These cross bars or pins are of proper length to cause the rollers 15 to fit snugly between the rings when the nuts 21 are tightened on the bolts 17, so that while the rollers 15 are capable of turning easily and smoothly on the said bolts, nevertheless there is practically no end play between them and the respective rings.

Attached to any available portion of the collar 9 is a lug 25, Figs. 3 and 4, which, therefore, rotates with the wheel 1. This lug 25 serves as the attachment point for a pair of helical springs 26 and 27 which are suitably connected to the lug 25 by means of pins or hooks 28. The remaining end of the spring 26 is secured to any suitable portion of either ring 18 or 19 or any member which moves therewith, for example the spacing member 23, and similarly the remaining end of spring 27 is held by the spacing member 24. The springs 26 and 27, therefore, serve as a resilient connection between the collar 9 and the pair of rings 18 and 19. A suitable protective housing 29 mounted on an end flange 30 may be secured to the housing 14 so as to protect the rings 18, 19 and the parts cooperating therewith against the entrance of dirt, oil, or water in service.

Also secured to the hub 3 of the wheel is a suitable brake member 31 which is held to said hub in any feasible manner, for instance by means of a flange 32 which may be fastened to the wheel hub 3 by the same cap screws 5 which hold the annular member 4 to the said hub. This brake member 31 in the form shown has two annular friction surfaces 33 and 34 formed on the outside faces of the two rings 35 and 36, which are spaced apart by the cooling vanes 37. This type of brake ring is disclosed and claimed in co-pending application Serial No. 159,844, filed August 19, 1937, now Patent No. 2,214,762, to which reference should be had for any necessary details. It suffices for the present instance to mention that suitable brake shoes will cooperate with the friction surfaces 33 and 34 to provide the desired braking action, when pressed laterally against said friction surfaces.

The flange 30, in addition to forming a protective closure for one end of the casing 29, also serves as a stationary anchorage for suitable electrical contact mechanism, as shown best in Figs. 1 and 3.

A bolt 38, which may be mounted in a lug 39 projecting inwardly from a portion of the flange 30, may be insulated from said flange by an insulating sleeve 40 and insulating washers 41, 41. A resilient member 42 such as a leaf spring, may be secured under the head 43 of said bolt and a nut 44 may be threaded on the other end of the bolt 38 so as to secure the attachment lug or connector 45 firmly to the said flange, while maintaining it electrically insulated therefrom. The insulated conductor 46, which is electrically connected to the connector 45 is thus put into permanent electrical connection with the spring 42.

At its other end the spring 42 carries on one side a head 47 preferably made of insulating material and on its other surface a contact member 48 in electrical connection with the spring 42. A cooperating contact member 49 is suitably mounted in the lug 39, insulating bushings 50 and 51 being applied thereto the maintain the contact 49 electrically insulated from the flange 30. The contact 49 is preferably in the form of a pin which may slide longitudinally within the bushings 50 and 51, and preferably has a collar 52 thereon which is engaged by a spring 53 or the like which urges the pin 49 away from the bushing 51, that is, toward the cooperating contact 48. The spring 53, however, permits contact 49 to yield when contact 48 engages it, so as to avoid any jamming action or undue pressure in operation of the device. The insulating bushings 50 and 51 are mounted so as to bear against shoulders in the lug 39 as shown, to prevent their dislodgement and maintain them in the proper portion.

The slidable pin or contact 49 is suitably connected to the conductor 54, which is electrically connected to the connector lug 55, held by the nut 56, and permanently in electrical connection with the pin or plunger 49. This may be accomplished in any of the ways well known in the electrical art.

A stop member 57 may also be provided to limit the travel of the resilient member 42 and this stop member 57, if not itself made of insulation must of course be suitably insulated from the flange 30 so as not to provide any electrical connection between the member 42 and the flange 30. A suitable device for this purpose consists of the bushing 58, which may be threaded into the lug 39 as shown, and which provides for adjusting the member 57 longitudinally in any desired way, for example, by means of the nut 59. The sole purpose of the stop member 57 is to prevent the free end 47 of the spring 42 from projecting too far away from the adjacent surface of the lug 39, in order normally to keep the said portion 47 out of contact with the ring 19 and thus prevent it from wearing out.

The casing 29 preferably is made in halves, for example as shown in Fig. 2, and these halves are secured to one another in any desired way, as by means of the bolts 60 and nuts 61.

Referring now to the modified form illustrated in Figs. 5, 6 and 7, 1 designates the wheel having a hub 3, said hub having a tubular extension 64 with a cylindrical outer surface 65 having formed therein a suitable number of grooves 66, three grooves being shown in the present example. Each of these grooves 66 is inclined at a slight angle to the general peripheral direction of the cylindrical surface 65, as shown clearly in Fig. 7, and each of the grooves is of proper width to receive snugly but yet freely the periphery of one of a corresponding number of rollers 67, three of these being shown, as will be best seen from Fig. 5.

Each roller 67 is carried upon a shaft or pin 68, which in turn is mounted in bearings or bushings 69 suitably disposed in lugs 70 projecting from the inner surfaces of the two rings 62 and 63 which are mounted a suitable fixed distance apart as, for example, by means of spacing members or pins 73, 74, and 75, the whole being so arranged that the rollers 67 may rotate freely about their own axes but yet without any lost motion or play.

A suitable lug 76 may be secured to the tubular member 64 and carry a pivot 77 serving as an anchorage for the springs 78 and 79, which extend from said pivot 77 respectively in opposite directions, their remaining ends being secured to the pins 73 and 74 which are rigidly connected to the two rings. The pair of rings 62 and 63 will thus be held to the rotating hub solely by means of the three rollers 67 and the two springs 78 and 79, said springs being so arranged that normally the rollers 67 will maintain said two rings 62 and 63 in a central position with respect to the portion 65 of the tubular extension 64.

For protection against water, dirt and the like, it is preferred to enclose the rings 62 and 63 within a casing which may conveniently be made of two sections 71 and 72 held together by means of bolts 80 and nuts 81. This casing may be secured to any stationary part of the vehicle and serves also as a convenient support for electrical contacts which cooperate with the rings 62 and 63. These contacts are housed in the containers 82 and 83, each of which preferably holds two contacts which are insulated from the containers and from each other. Each of these contacts preferably is resilient or yieldably mounted, although it is not absolutely necessary.

The container 82 supports the contacts 84 and 85, and similarly the container 83 supports the contacts 86 and 87, these contacts having their inner ends disposed in proper positions to cooperate with the rings 63 and 62 respectively so that such rings, which are preferably made of metal or at any rate have conducting surfaces, may constitute electrical connections between contacts 84 and 85 on the one hand or between contacts 86 and 87 on the other hand when the rings shift longitudinally of the axis of the wheel 1. Such shifting of the rings 62 and 63 occurs whenever said rings rotate relatively in one direction or the other about the hub of the wheel 1, by reason of the rollers 67 travelling in the grooves 66. A closure member 88 or flange may be used to seal the opening between the hub 3 of the wheel and the housing 14. Suitable electrical conductors will, of course, be connected to the contacts 84, 85, 86 and 87, corresponding to the conductors used in the form hereinabove described and illustrated in Figs. 1 to 4.

A third modification, which is illustrated in Figs. 8 and 9, also has a tubular extension 89 formed on or attached to the hub 3 of the wheel 1, and surrounding the housing 14, with a flange or closure member 90 secured thereto in any suitable way, for instance by means of the cap screws 91. The member 90 in this form has a flat flange 92, and a cylindrical flange 93 formed integral therewith. A suitable ring 94, of L-shaped cross section, cooperates with the flanges 92 and 93 to form an entirely closed housing. The member 94 may be secured to the flange 92 by cap screws 95 or in any other suitable manner, so as to form a substantially tight enclosure and prevent the entrance of dirt or water. The flange 93 has a cylindrical outer surface 96 having therein grooves 97 which preferably are shaped in the same way as the groove 13 shown in Fig. 3, that is, each groove has two arms extending at an angle and in opposite directions from a central point. A corresponding roller 98 cooperates with each groove 97 in exactly the same manner that the roller 15 of Fig. 3 cooperates with its groove 13. It will be understood that three such rollers and grooves are preferably employed, as in the other forms.

Each roller 98 is supported on a pin or shaft 99 which may be the shank of a bolt, as shown best in Fig. 9, said bolt passing through the two rings 100 and 101 and being secured by a suitable nut or the like 102. The two rings 100 and 101 are substantially parallel to one another and are spaced apart a suitable distance to allow the rollers 98 to rotate freely yet without lost motion or end play, just as in the other previously described forms. For this purpose the bolts themselves may act as spacers in the well known manner, for example by providing tubular sleeves such as 103 thereon surrounding the bolts and of sufficient length to hold the rings 100 and 101 properly spaced when the nuts 102 are tightened.

A lug 104 suitably secured to the rings serves as an anchorage for the two springs 105 and 106. In this case, however, the springs are indicated as compression springs instead of tension springs and, therefore, the projecting ends of a small pin or the like 107 extending through the lug 104 may serve to hold the ends of the said two springs in proper position. The remaining or outer ends of the springs may be adjusted by means of screws 108 and 109, threaded through lugs 110 and 111, respectively, formed in or on the casing member 94. By turning the screws 108 and 109 it is possible to adjust the degree of compression of each of the said springs to the desired extent, so as to "center" the rollers 98 in their grooves 97.

A pair of contacts mounted in a holder or support 112 is secured to the flange 92, the respective contacts 113 and 114 being suitably insulated from the flange 92 and from one another. These contact members extend into proximity to the outer face of the ring 100, so that under certain conditions the ring 100 may abut against said contacts and thereby provide electrical connection between them. The remaining or outer ends of the contacts 113 and 114 extend outward into proximity to the two contact rings 115 and 116 respectively, which have suitable binding posts or other connectors 117 and 118 thereon for the attachment of conductors leading to the electrical devices which are to be actuated. It will be understood that the contact rings or slip rings 115 and 116 are stationary and in practice they will be secured to any suitable relatively stationary portion of the vehicle, which will hold them in proper proximity to the contacts 113 and 114. The contacts 113 and 114 are slidably supported in the holder 112 and normally yieldably biased in any suitable manner to remain out of contact with the ring 100, as well as with rings 115 and 116. This may be accomplished by suitable springs or the like.

Referring now to the diagram of electrical connections shown in Fig. 10, here 119 and 120 diagrammatically represent a connected pair of inertia rings, such as those disclosed in each of the forms of the invention hereinabove described, and it is assumed that these rings jointly will move in an upward direction when acceleration exists. Upon so moving, the ring 120 will establish electrical connection between the adjacently disposed electrical contacts 121 and 122, the effect of which will be to establish an electrical circuit through the conductor 123, the energizing winding 124 of a relay, the conductor 125, the source of electrical energy 126, the contact 122 and the ring 120.

The relay also has a further energizing winding 127, one end of which is connected to the source of energy 126 through the conductor 128 and the other end of which terminates in the contact 129. A contact element 130, carried by the armature 133 of the relay, will establish electrical connection between the contacts 129 and 131 whenever current flows through the coil 124, so as to attract the armature 133. From the contact 131 current will then flow through the conductor 132 to the contact 134, the switch blade 135, the contact 136, the brake coil 137, conductor 138, the bi-metallic thermostat element 139 and conductor 140, and thus back to the source of energy 126. A block of insulating material 141 is interposed between the switch blade 135 and the thermostat element 139, so as to prevent a short-circuit between said two devices.

The thermostatic switch is normally closed, that is, when there is no current flowing through the thermostatic member 139 the switch blade 135 will establish and maintain connection between the contacts 134 and 136. When the thermostatic element 139 becomes heated to a sufficient extent it will flex and thereby lift the resilient switch blade 135 out of contact with the terminals 134 and 136 and thus break the connection therebetween. The brake coil 137 will suitably control the valve 142 to produce any desired actuation thereof, this part being purposely shown very diagrammatically to indicate that any arbitrary action may be provided, so as not to restrict the diagram to any specific type of valve actuation.

The operation of the various embodiments of the invention hereinabove described is as follows:

Referring first to the form shown in Figs. 1, 2, 3, and 4 it will be clear that whenever the wheel 1 rotates the rings 18 and 19 will be carried along in such rotation, because they are connected to the hub of said wheel through the springs 26 and 27. However these springs allow transient deviations between the rotation of the rings and of the wheel, because of their yieldability. Thus when any excessive acceleration occurs, the wheel and the rings will become shifted angularly about their joint axis with respect to one another, and will remain so during such time as the acceleration is sufficient to overcome the forces exerted by the springs. Thus, should the rotation of the wheel 1 be suddenly slowed down by reason of excessive braking, or should the wheel slip on the rails or on the road surface, it is obvious that the inertia of the rings 18 and 19 will suffice to overcome the springs, whereby the rings will move angularly about the axis of the wheel and in so doing the rollers 15 will move along the grooves 13.

Inasmuch as these grooves are arranged at an angle, this shifting of the rollers along the grooves will produce an axial shift of the pair of rings 18 and 19, in the direction to the right in Fig. 1, or upward in Fig. 3. This shifting of the rings will cause the ring 19 to engage the head 47 on the spring 42, which will force the contact 48 into engagement with the cooperating contact 49, thus establishing an electrical connection between the conductors 46 and 54. It is clear that the same effect will be produced regardless of the direction of rotation of the wheel 1, since in either case the rollers 15 will ride in one direction or the other along the grooves 13, starting from the central or neutral position indicated in Fig. 3, and because both arms of each groove are angularly inclined, it is immaterial in which angular direction the force produced by the acceleration acts, because in either event the rings 18 and 19 will ride toward the head 47.

It is also clear that this engagement of the ring 19 against the head 47 will last only while the acceleration is sufficient to overcome the combined action of the springs 26 and 27 to a sufficient degree to move the rings 18 and 19 toward the said contact members. A great advantage results from this, for there is no wear on the head 47 in the normal condition of the parts, since the head engages the ring 19 only when abnormal acceleration exists, that is, during the time that an actual electrical signal or current is to be established through the conductors 46 and 54 for the purpose of influencing the braking action, or give a signal or accomplish any other desired function. Mere normal jolting of the vehicle does not suffice to actuate the contacts, and thus false signals are avoided.

The modification disclosed in Figs. 5, 6 and 7 will operate in a similar way, with the exception that since the grooves 66 in this modification are continuous in one direction instead of extending at opposite angles from a neutral or center point, as in the preceding form, the rings 62 and 63 will travel in one axial direction when the acceleration is in one sense and will travel in the opposite axial direction when the acceleration is in the opposite sense. In other words, the rings, instead of always traveling away from the wheel, as in the first described form, will sometimes travel away from the wheel and at other times toward the wheel, so that for this reason a modification of the contacts is necessary.

Accordingly when the rings travel to the right in Fig. 6 the ring 63 will establish electrical connection between the contacts 84 and 85, whereas when the rings travel in the other direction the ring 62 will establish electrical connection between the contacts 86 and 87.

When insufficient acceleration exists to overcome the forces exerted by the springs 78 and 79, the rings will assume their normal or central positions, as illustrated in Figs. 6 and 7, wherein neither ring touches any of the contacts. Hence in this form there is likewise no wear on the contacts except when an electrical current is desired to flow, as when controlling the brake mechanism or indicating the braking action, and no false electrical impulses are given by mere accidental jolting and the like of the vehicle.

In the third modification, disclosed in Figs. 8 and 9, the same kinds of grooves are employed as those shown in Fig. 3, hence the acceleration will always produce motion of the rings 100 and 101 toward the left from the position shown in Fig. 9, regardless of the sense of the acceleration or the direction of rotation of the wheel. The first effect of this shifting of the rings will be that the ring 100 will abut against the sliding contacts 113 and 114, whereupon further shifting of the rings will cause said contacts to move to the left until they bear respectively against the slip rings 115 and 116 whereby they establish electrical connection between the conductors attached to the binding posts 117 and 118, which control the electrical currents.

Here again the ends of the sliding contact members 113 and 114 will not wear out easily since they bear against the slip rings only when actually establishing the electrical connection so that there is no needless wear on either the contacts or the slip rings when such electrical connection is not established. The chief difference between this form of device and the first two is that in this form the protecting case which encloses the inertia rings revolves with the wheel hub instead of being stationary with respect to the vehicle, as in the first two forms. An incidental advantage of this type is that the springs 105 and 106 may be adjusted readily by turning the screws 108 and 109 without opening the protective casing.

The operation of the electrical circuits disclosed diagrammatically in Fig. 10 may be readily understood from the diagram, but for the sake of completeness it is briefly recapitulated here as follows:

When electrical connection is established between the contacts 121 and 122 which, it will be understood, represent any of the contacts shown in Figs. 1 to 9, by reason of upward motion of the rings 119 and 120 which likewise represent any of the joined inertia rings of Figs. 1 to 9, the first effect will be to cause a flow of current from the source 126 through the winding 124 of the relay, which thereupon will attract the armature 133 downward about its pivot 143, whereby the contact member 130, which is also connected to the movable member of the relay, will establish electrical connection between the contacts 129 and 131, thus establishing an electric current through winding 127 which is also supplied from the source 126.

This winding 127 is amply capable of holding down the armature 133 without any aid from the winding 124, so that any momentary connection between contacts 121 and 122, of sufficient duration merely to energize the winding 124 for an interval long enough to bring down the armature 133, will establish a continuous flow of current through the winding 127, which will then continue to hold down the armature 133 even after the circuit again is broken at contacts 121 and 122. This will then establish and maintain a flow of current through the winding 137, which is in series with the winding 127 and is supplied from the same source 126.

The flow of current through the winding 137 must be maintained for a time interval sufficient to actuate the valve 142, but obviously it is not desired that current should continue to flow indefinitely through the coil 137. Therefore, the thermostatic element 139 is provided also in series with the coils 127 and 137, so that as soon as current flows through this circuit the thermostatic device 139 will begin to become heated thereby. When its temperature has risen sufficiently, it will break the circuit at contact points 134 and 136 by flexing and thus lifting the flexible switch member 135 away from one or both of said contacts.

The resiliency or yieldability of the switch member will prevent instantaneous opening of the circuit, because it is necessary for the thermostatic member 139 to lift the switch member 135 through a slight distance before the same will finally leave the cooperating contacts 134 and/or 136, thus giving sufficient time for the relay coil 137 to act on the valve 142. The degree of resiliency of the switch member 135 of course depends upon the rapidity of response of the thermostat 139 and if such thermostat is sluggish enough even a rigid switch member may be found satisfactory.

When the circuit is broken, current will cease to flow through the windings 127 and 137 and the armature 133 will thereupon be raised by the spring 144 so as to break the circuit also at the contacts 129 and 131. Thereupon the thermostat 139 will cool spontaneously and reestablish the connections at 134 and 136 so that the circuit is again restored to its initial condition ready to respond to the next electrical impulse conveyed through contacts 131 and 132, when next the rings 119 and 200 are shifted, due to wheel slide or the like.

Particular attention is directed to the fact that in all the forms disclosed the springs act so as to control the angular or circumferential shift of the rings about the wheel axis and that the said angular motion of the rings is converted into an axial shift by means of the rollers and grooves. Owing to the relatively small angle of inclination of the grooves in which the rollers run, it is clear that this construction constitutes a self-locking device wherein lateral shocks, no matter how severe, cannot cause actuation of the rings and that, nevertheless, said rings are very sensitive to the acceleration variations desired to be indicated.

This self-locking effect will occur whenever the slope is so small that the trigonometric tangent of the angle made by the direction of the groove with respect to the plane of rotation of the wheel is less than the coefficient of friction of the rollers in the groove or grooves. Under these conditions it is impossible for any axial force applied to the rings to produce a sufficiently great component along the grooves to overcome the friction and cause motion along such grooves and therefore under such values of the groove angle as fulfil the said tangent condition no lateral jolting can cause the rings to move axially.

This is a distinct advantage over other forms of devices wherein springs act axially or laterally to oppose the rings, which are free to move axially against such springs, whereupon a sudden side sway or lateral jolt of the vehicle will have the same effect as would a sudden acceleration, that is, a false signal will be given.

It will also be noted that the present device is located directly on the wheel or axle, that is, it is driven directly by such wheel or axle and not by means of belts or other power transmitting devices. This gives added simplicity and ruggedness to the present apparatus, which is of course a highly important advantage in devices which are to be used with heavy vehicles such as railway cars, trucks, etc.

It will be understood that while electrical actuation has been disclosed in the present specification, mechanical or pneumatic actuation could likewise be substituted if preferred for any reason. In other words, the rings which move axially are suitable for controlling any desired mechanism whether it is an electrical contact device, an air valve, or a rod or lever, such equivalents being well known in the art so that it is believed to be unnecessary to more than mention the fact that other means may be employed instead of the electrical devices if preferred.

It should also be borne in mind that while ordinarily the parts will be so proportioned and adjusted that an indication or signal will be given only when wheel slide is about to occur or actually occurs, that is, when the brakes are applied too powerfully, it is of course possible to adjust the elements in such way that an indication is given when any predetermined arbitrary value of acceleration is exceeded, so that the device is not limited to actuation solely upon the actual occurrence of wheel slide but is designed to prevent wheel slide. For example in Fig. 8, the delicacy of response may be adjusted readily by varying the settings of the springs 105 and 106, and means for adjusting the tensions of the springs used in the other modifications may of course also be provided if desired.

Having described several modifications of the invention by illustrative examples thereof, it will, of course, be understood that these modifications are to be considered merely as illustrations and not as limitations of the invention and that many modifications may be made without departing from the inventive principles involved.

For an understanding of the substance and scope of the invention attention is directed to the following:

What we claim is:

1. An acceleration responsive device comprising a rotary member, an inertia member coaxial therewith, resilient means constraining said members to rotate together under normal conditions but yieldable under the stored energy in said inertia member to permit limited relative rotation between said members upon acceleration of said rotary member beyond the normal, the inertia member being guided in its relative rotation by inter-engaging guiding and radial supporting means, respectively, on said members, said supporting and guiding means comprising a plurality of circumferentially spaced rollers on one member and trackways on the other member, one for each roller and in which the respective roller is guided on the other member, said trackways being slightly inclined to a plane nomal to the axis of said members, whereby acceleration of the rotary member beyond the normal causes the inertia member to rotate relative thereto and in said rotation to shift axially to initiate a control impulse.

2. An acceleration responsive device according to claim 1 in which the rollers normally occupy a position centrally of their respective trackways, whereby acceleration, positive or negative, of the rotary member beyond the normal causes the inertia member to shift axially.

3. An acceleration responsive device according to claim 1 in which said trackways incline in opposite directions from a central portion, whereby upon sudden acceleration of the rotary member, positive or negative, the inertia member moves axially in the same direction.

4. An acceleration responsive device according to claim 1 in which the axis of the rollers is substantially normal to the direction of the trackways.

5. An acceleration responsive device according to claim 1 in which the inertia member comprises a pair of spaced rings and the rollers are mounted between them.

6. An acceleration responsive device according to claim 1 in which the inertia member comprises a pair of spaced rings and resilient means comprises a pair of coil springs arranged between said rings, said springs acting in opposite directions and each secured at one end to one, and at the other end to the other, of said members.

7. An acceleration responsive device according to claim 1 in which the trackways comprise grooves on one member cooperating with rollers extending into said grooves on the other member.

8. An acceleration responsive device comprising a rotary member, an inertia member coaxial therewith, resilient means constraining said members to rotate together under normal conditions but yieldable under stored energy in said inertia member to permit limited relative rotation between said members upon acceleration of said rotary member beyond the normal, the inertia member being guided in its relative rotation by guide means on one of said members and means engaging said guide means on the other of said members, the guide means being slightly inclined to a plane normal to the axis of said members, whereby the acceleration of the rotary member beyond the normal causes the inertia member to rotate relative thereto and in said rotation to shift axially to provide a control force, the inertia member being mounted in a closed housing, between which and said inertia member the inter-engaging guide means are arranged, said housing and inertia member being a unitary structure assembled as a unit with the rotary member.

9. An acceleration responsive device comprising a rotary member, an inertia member coaxial therewith, generally tangentially-arranged resilient means forming the sole means for constraining said members to rotate together under normal conditions but yieldable under stored energy in said inertia member to permit limited relative rotation between said members upon acceleration of said rotary member beyond the normal, the inertia member being guided in its relative rotation by guide means on one of said members and means engaging said guide means on the other of said members, the guide means being slightly inclined to a plane normal to the axis of said members, whereby the acceleration of the rotary member beyond the normal causes the inertia member to rotate relative thereto and in said rotation to shift axially to provide a control force, the rotary member being enclosed in a housing and the resilient means being connected with the housing through adjustable means extending outside the periphery of the housing and operable from the outside of the housing for adjusting the tension of said resilient means.

CAROLUS L. EKSERGIAN.
JOSEPH H. COOMBES